(12) United States Patent
Kaneko et al.

(10) Patent No.: US 6,985,287 B2
(45) Date of Patent: Jan. 10, 2006

(54) MEDICAL BINOCULAR STEREOMICROSCOPE

(75) Inventors: Norio Kaneko, Tochigi-ken (JP); Toshiyuki Takase, Tochigi-ken (JP); Kanji Matsutani, Tochigi-ken (JP)

(73) Assignee: Mani, Inc., Tochigi-ken (JP)

( * ) Notice: Subject to any disclaimer, the term of this patent is extended or adjusted under 35 U.S.C. 154(b) by 0 days.

(21) Appl. No.: 10/026,468

(22) Filed: Dec. 27, 2001

(65) Prior Publication Data
US 2003/0123145 A1 Jul. 3, 2003

(30) Foreign Application Priority Data
Dec. 28, 2000 (JP) .............................. 2000-399764

(51) Int. Cl.
G02B 21/22 (2006.01)
(52) U.S. Cl. ........................ 359/377; 359/380; 359/385
(58) Field of Classification Search ................ 359/368, 359/372, 373, 374, 375, 376, 377, 378, 379, 359/380, 385, 386, 387, 388, 389, 390
See application file for complete search history.

(56) References Cited

U.S. PATENT DOCUMENTS 3,909,106 A * 9/1975 Buhler ........................ 359/377
5,126,877 A * 6/1992 Biber ........................... 359/389
5,760,952 A * 6/1998 Koetke ........................ 359/389
2002/0109912 A1 * 8/2002 Knoblich .................... 359/385

FOREIGN PATENT DOCUMENTS

| DE | G 9408066.6 | * 11/1994 |
| EP | 0723175 | * 7/1996 |
| EP | 0793128 | * 9/1997 |

* cited by examiner

Primary Examiner—Mark A. Robinson
(74) Attorney, Agent, or Firm—Townsend & Banta

(57) ABSTRACT

This invention serves to solve the problem of the large irradiation angle upon an observation target of an inclined illuminator type medical binocular microscope, and the problem of structural complexity and light attenuation of a coaxial illuminator type microscope.

The microscope A includes the illumination system 2 comprised of the illumination unit 6 with the condensing lens 6d attached at a front tip of the illumination unit, disposes the illumination system retaining member 7 in close proximity to the two observation optical systems structured at the body tube 3, defines the plane 8 including the prescribed lenses of the objective lenses of the left and right observation optical systems 1 (secondary objective lens 1b) arranged closest to the observation target, and arranges the optical axis 2a of the illumination system 2 inside the circle 9 having a diameter connecting the optical axis 1a of the two observation optical systems with respect to the plane 8. The optical axis 2a intersects with the optical axis 1a of the observation optical system 1 at the observation target surface 4a.

3 Claims, 4 Drawing Sheets (a)

(b)

MEDICAL BINOCULAR STEREOMICROSCOPE

BACKGROUND OF THE INVENTION

1. Field of the Invention

This invention relates to a binocular medical stereomicroscope used in the medical field, especially for dental examination and dental treatment and, more particularly, to a medical binocular stereomicroscope for using an illumination unit as an illumination optical system and arranging the illumination unit in close proximity to an observation optical system to allow effective illumination even upon an undulated area.

2. Description of Related Art

Medical stereomicroscopes are widely used during dental examination, treatment or observation. When using a medical stereomicroscope for dental examination or treatment, the observation target is frequently a tooth or a root canal in which both usually have considerable ruggedness. Therefore, adequate brightness and field depth are required for obtaining a clear visual field. Particularly in a case where there is difference in height within a narrow field, a lower portion would be affected from a shadow of a higher portion; therefore, the creation of a shadow should be restrained as much as possible. Further, when a physician performs examination, treatment, or observation, a sufficient amount of space is required between a lower end portion of a medical stereomicroscope and the targeted affected area.

An example of such medical stereomicroscope will be explained with reference to FIG. 4. First, a structure of an inclined illuminator type microscope will be explained with reference to FIG. 4(a). An inclined illuminator type microscope 51 shown in the figure allows illumination and observation of an observation target 55 without having a common lens (primary objective lens) 54 shared by an observation optical system 52 and an illumination optical system 53. An illumination optical component comprising the illumination optical system 53 is attached at a bottom edge portion of a body tube 51a of the inclined illuminator type microscope 51 and is arranged so that an optical axis 52a of the observation optical system 52 and an optical axis 53a of the illumination optical system 53 coincide at a surface of the observation target 55 in a manner shown in the figure when a plane including two optical axes 52a of the observation optical system 52 is viewed from the side.

Regarding the relation between the optical axis 52a and the optical axis 53a with respect to a plane 57 including the two secondary lenses 56 comprising the observation optical system 52 of the inclined illuminator type microscope 51, the optical axis 53a of the illumination optical system 53 will not be inside a circle 58 when the diameter of the circle 58 is defined as the separated distance between the optical axes 52a of the two observation optical systems 52a. Accordingly, the optical axis 52a and the optical axis 53a coinciding at the surface of the observation target 55 would form a large angle.

Further, FIG. 4(b) is an explanatory view showing a structure of a coaxial illuminator type microscope 59. The coaxial illuminator type microscope 59 shown in the figure allows illumination and observation of the observation target 55 having the common lens (primary objective lens) 54 shared by the observation optical system 52 and an illumination optical system 60. The illumination optical system 60 is arranged inside of a body tube 59a of the coaxial illuminator type microscope 59 and arranged in a position for avoiding a variable magnification optical system 61. That is, the illumination optical system 60 has plural lenses including a prism 60b structured inside the body tube 59a, in which the prism 60b refracts an optical axis 60a for avoiding the variable magnification optical system 61, and then the optical axis 60a coincides with the optical axis 52a of the observation optical system 52 at the surface of the observation target 55 via the primary objective lens 54.

Regarding the relation between the optical axis 52a and the optical axis 60a with respect to the plane 57 including the two secondary lenses 56 comprising the observation optical system 52 of the coaxial illuminator type microscope 59, the optical axis 60a of the illumination optical system 60 will not be inside the circle 58 and will be refracted by the primary objective lens 54 in a direction toward the observation target 55 when the diameter of the circle 58 is defined as the separated distance between the optical axes 52a of the two observation optical systems 52a. Accordingly, the optical axis 52a and the optical axis 53a coinciding at the surface of the observation target 55 would form a small angle.

In respect of the foregoing inclined illuminator type microscope, since the optical axis of the observation optical system and the optical axis of the illumination optical system form a large angle, the optical axis of the illumination system will be in a position forming a large angle with respect to the surface of the observation object and result to a problem of the creation of a large shadow upon a subject undulated portion (e.g. root canal) of the observation target when the optical axis of the observation optical system is positioned perpendicular to the surface of the observation target.

Further, since the illumination optical component comprising the illumination optical system is externally attached to the body tube, the illumination optical component including a holder and the like will be exclusively required for the microscope and will be costly.

In respect of the foregoing coaxial illuminator type microscope, since the optical axis of the observation optical system and the optical axis of the illumination optical system form a small angle, illumination could be performed without forming a relatively large shadow upon the subject undulated portion of the observation target. However, since the illumination optical system is structured within the same body tube as the observation optical system, the path of the optical axis of the illumination optical system will be complex, numerous components such as a prism, lenses or the like will be necessary and a problem regarding cost will be raised. Further, the light irradiated from a light guide transmitted through the prism and plural lenses would raise a problem where luminance will attenuate and have a negative influence upon visual field brightness.

SUMMARY OF THE INVENTION

For solving the foregoing problems this invention relates to an inclined illuminator type binocular medical stereomicroscope comprising: right and left observation optical systems, each having a plurality of lenses for observing an observation target; and an illumination optical system having an illumination unit for illuminating an object targeted for observation; wherein the illumination unit has an optical axis arranged inside a circle, the circle having a diameter connecting the optical axes of the right and left observation optical systems in a plane including at least the lenses of the right and left observation optical systems positioned closest to the observation target.

Although the foregoing binocular medical stereomicroscope (hereinafter simply referred as "microscope") is an inclined illuminator type microscope, an illumination effect equaling to a coaxial illuminator type microscope could be obtained by disposing the illumination unit in close proximity to the observation optical system of the binocular microscope, by arranging the plane as including the prescribed lenses of the objective lenses of the observation optical systems positioned closer to the observation target, by disposing the optical lens of the illumination unit inside the circle on the plane where the line connecting the optical axes of the right and left observation optical systems serves as the diameter of the circle, and by coinciding the optical axis of the observation optical system and the optical axis of the illumination unit at the surface of the observation target.

In other words, since the circle having the line connecting the optical axes of the right and left observation optical systems as the circle diameter is arranged on the plane including the prescribed lenses of the observation optical system positioned closest to the observation target, and since the illumination unit is disposed to enable the optical axis of the illumination unit to be inside the circle and coincide with the optical axis of the observation optical system at the surface of the observation target, the optical axis of the illumination unit and the optical axis of the observation optical system would be in close proximity with each other and form a small angle, and a portion of the observation target subject for observation could be effectively illuminated.

Regarding the foregoing microscope, the magnification-changing form for the observation optical system should preferably be a zooming type. The observation optical system will not require an area larger than the size of the lens and the illumination unit could be disposed extremely in close proximity to the observation optical system by using a zooming type as the magnification-changing form for the microscope.

It is an object of this invention to provide a medical binocular stereomicroscope for solving the problem of the large irradiation angle upon an observation target of an inclined illuminator type microscope, and the problem of structural complexity and light attenuation of a coaxial illuminator type microscope.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF THE PREFERRED EMBODIMENTS

Figure 1:
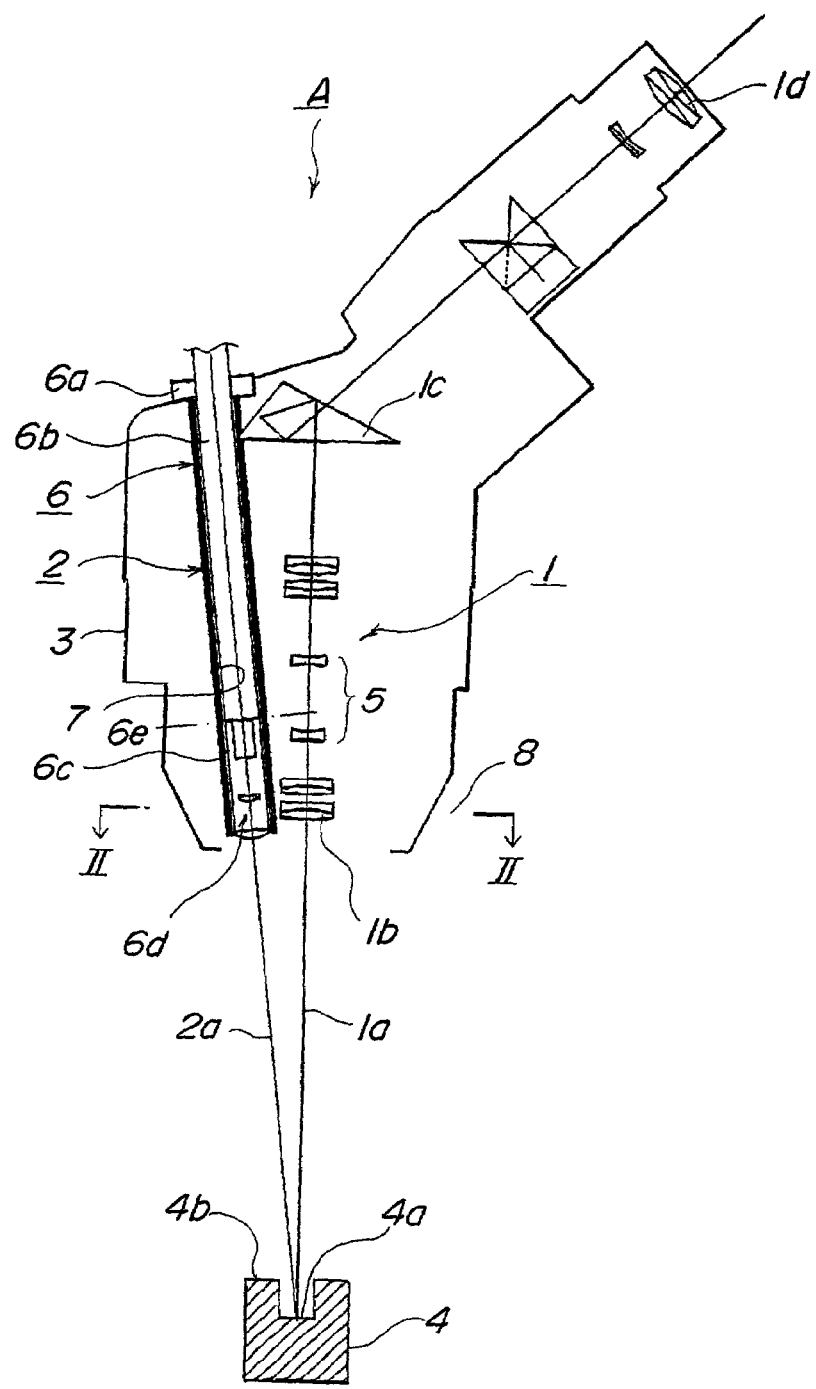
FIG. 1 is an explanatory view showing a structure of a microscope regarding the first embodiment.
Figure 2:
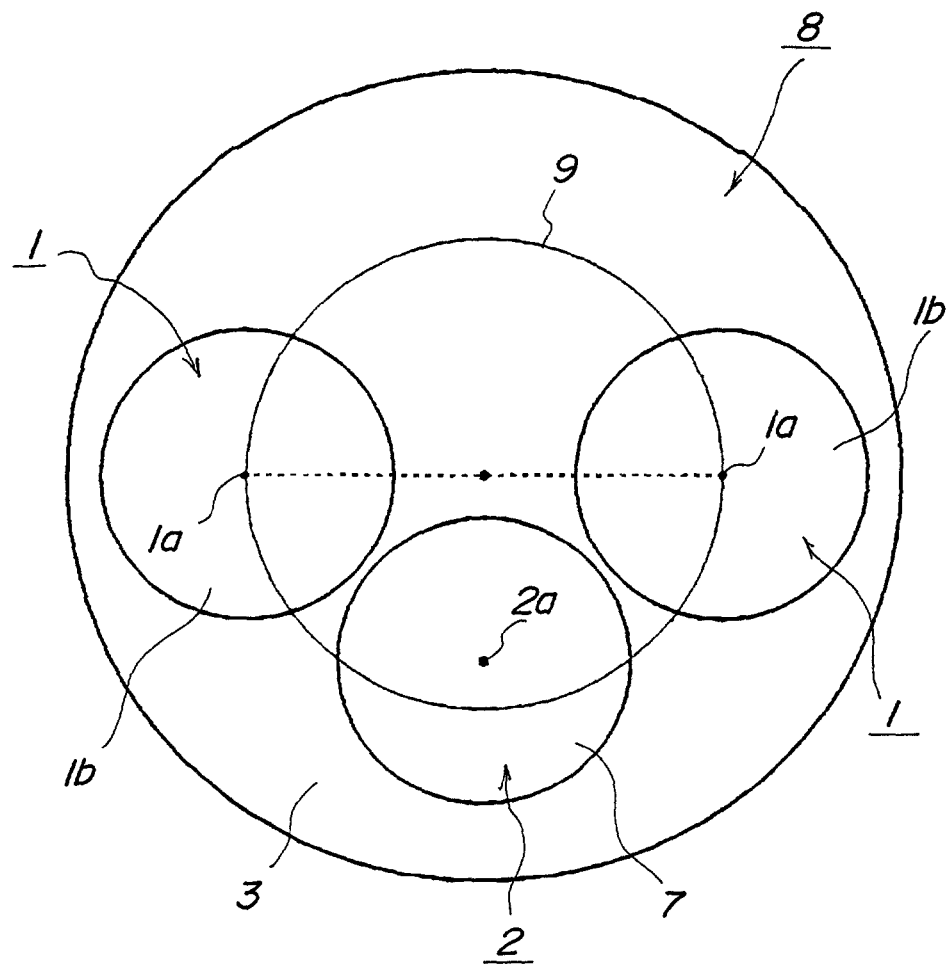
FIG. 2 is an explanatory view showing the relation between an optical axis of an observation optical system and an optical axis of an illumination unit and is also a cross sectional view of II—II of FIG. 1.
Figure 3:
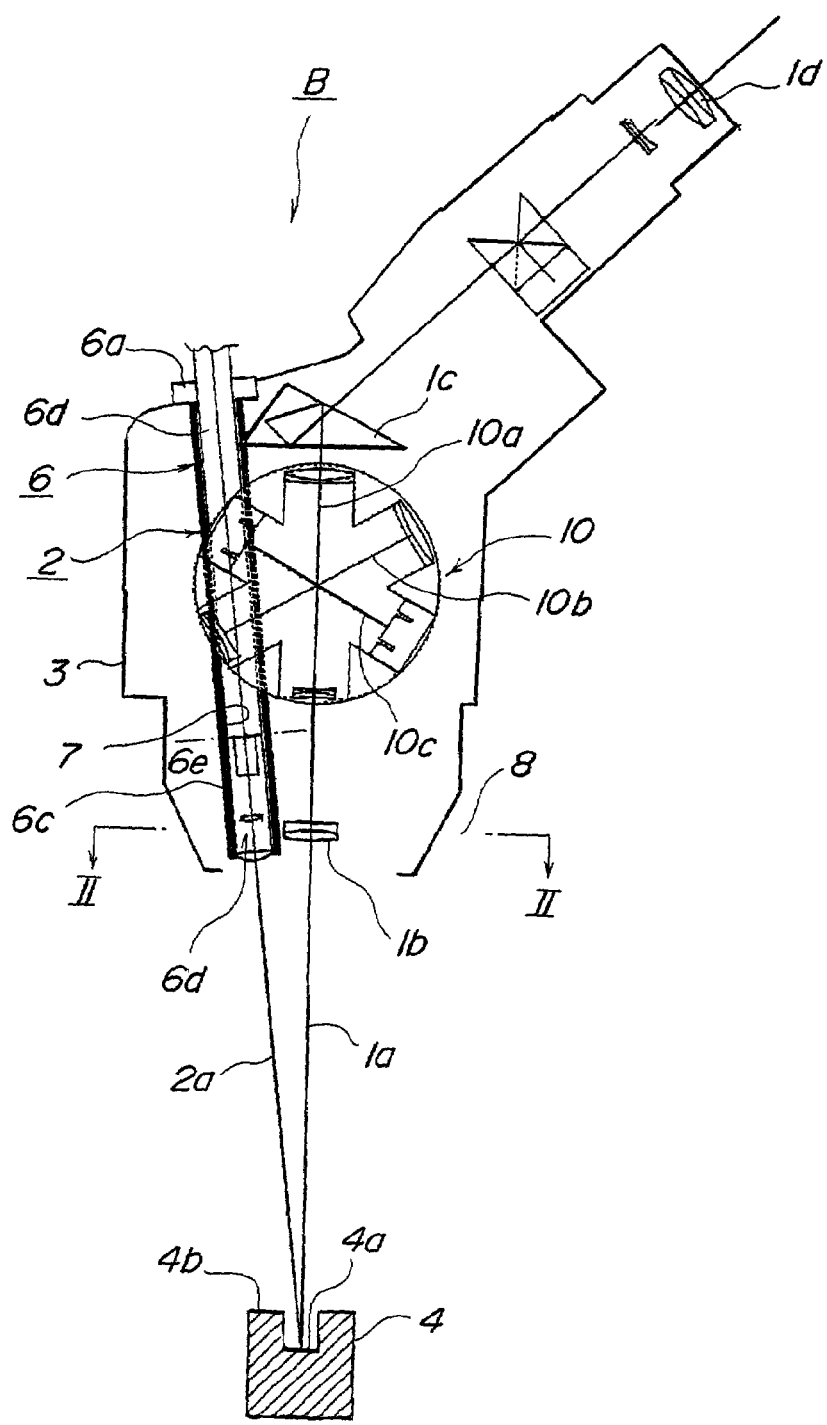
FIG. 3 is an explanatory view showing a structure of a microscope regarding the second embodiment.
Figure 4:
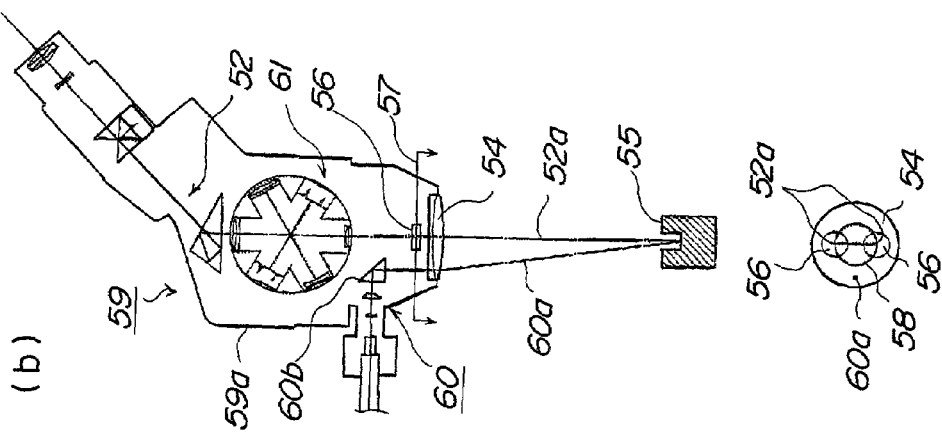
FIG. 4 is an explanatory view showing an illumination system of a conventional inclined illuminator type microscope and an illumination system of a conventional coaxial illuminator type microscope.
Figure 4:
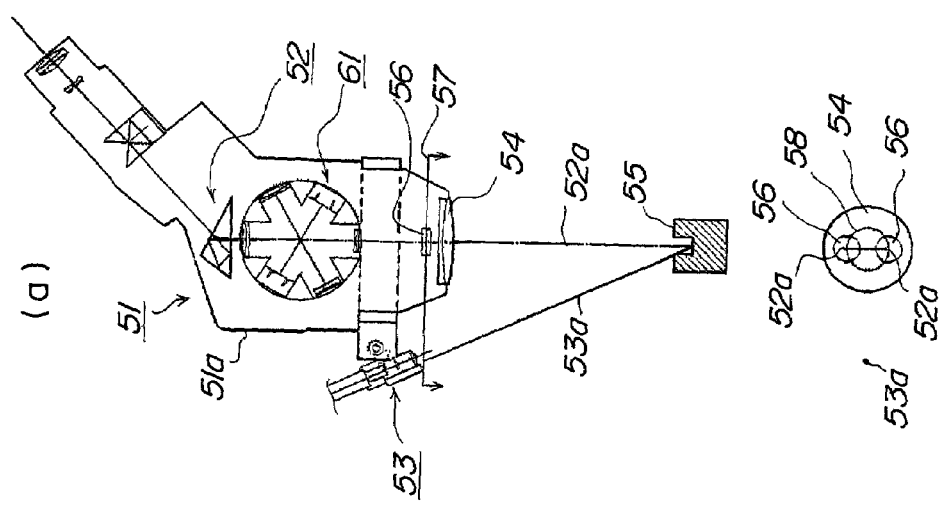

In the following embodiment, the medical binocular stereomicroscope regarding this invention will hereinafter be described as a microscope used for dental use. FIG. 1 is an explanatory view showing a structure of a microscope regarding the first embodiment. FIG. 2 is an explanatory view showing the relation between an optical axis of an observation optical system and an optical axis of an illumination unit and is also a cross sectional view of II—II of FIG. 1. FIG. 3 is an explanatory view showing a structure of a microscope regarding the second embodiment.

A structure of a microscope A regarding the first embodiment will be described with reference to FIG. 1 and FIG. 2. The microscope A is used for dental examination and dental treatment in which the microscope A is brought close to a patient to observe and to examine an affected area, or to observe and treat an affected area. The microscope A is structured as a binocular microscope, and FIG. 1 is a cross sectional view where a plane including the optical axes 1a of two observation optical systems 1 is viewed perpendicularly from the side.

The microscope A is comprised of the two observation optical systems 1 and an illumination optical system 2, in which each observation optical system 1 is disposed apart from each other at a distance required for a binocular microscope, and the illumination optical system 2 is disposed in close proximity to the observation optical system 1. Maintaining such disposition, each observation optical system 1 and the illumination optical system 2 are arranged in a body tube 3 comprising the microscope A.

More particularly, although the microscope A is structured as an inclined illuminator type microscope, the microscope A serves to reduce the influence of shadows caused by the illumination optical system 2 created upon an observation target 4 as much as possible, and enables to provide observation of the observation target 4 equaling to that of a coaxial illuminator type microscope. Since a commonly sold component (an illumination unit 6 comprised of a fixing member 6a, a light guide 6b, a holder 6c, a condensing lens 6d and the like) is used as the illumination optical system 2, the problem regarding cost could be solved.

The observation optical system 1 magnifies an observation target surface 4a, e.g. a root canal, of the observation target 4, e.g. a tooth, to a prescribed magnification for performing observation. The observation optical system 1 is comprised of a group of plural lenses including right and left secondary objective lens 1b disposed closest to the observation target 4 and a prism 1c; further, a magnification-changing portion 5 of a zooming type is disposed between the secondary objective lens 1b and the prism 1c.

Typically, an objective lens disposed closest to the observation target 4 serves as a single primary objective lens including the optical axes 1a of the two observation optical systems 1 arranged left and right. However, since the microscope A and a microscope B of the first and second embodiment explained below are structured without a primary objective lens, the lens disposed closest to the observation target 4 serves as the secondary objective lens 1b.

A prescribed lens disposed at the zooming type magnification-changing portion 5 is handled externally by a dentist and is moved along the optical axis 1a so that magnification could be changed into a magnification most suited for observing the observation target surface 4a. Accordingly, in terms of the zooming type magnification-changing portion 5, the body tube 3 is formed as a tubular shape extending along the optical axis 2a so that no additional projecting portion will be required to be formed.

Further, regarding the two observation optical systems 1, the optical axes 1a are inclined inward between an ocular lens 1d and the secondary objective lens 1b, and are connected to form a focal point at the observation target surface 4a of the observation target 4 when viewed from either the left or right side of FIG. 1.

The thus structured observation optical system 1 is a typical structure of a microscope comprised with the zooming type magnification-changing portion 5.

The illumination optical system 2 functions to illuminate the observation target surface 4a of the observation target 4 and is comprised of the illumination unit 6, which is disposed and fixed to an illumination optical system retaining portion 7 formed at the body tube 3.

The illumination unit 6 comprises: the fixing member 6a, e.g. a bolt, for fixing the illumination unit 6 to the body tube 3; the light guide 6b for guiding light from an external light source (not shown); the holder for securing the light guide 6b and the condensing lens 6d; the condensing lens 6d being arranged at a tip of the light guide 6b and serving to condense the light irradiated from the light guide 6b; and is a typically sold light source device. That is, the illumination unit 6 has no unique usages, and therefore is cost effective. It should now be noted that the holder 6c could also be separately structured at the light guide 6b and the condensing lens 6d in which a connecting member 6e such as a bolt or a bayonet having an attachable function could be formed for connecting means.

The light guide 6b illuminates the entire surface of the observation target surface 4a to provide satisfactory observation, and has a predetermined illumination range and brightness. The light guide 6b is comprised of bundled optical fibers and is structured to irradiate the light from an external light source connected from one side.

The condensing lens 6d functions to condense the light irradiated from the light guide 6b for illuminating the entire surface of the observation target surface 4a, is arranged in a predetermined distance at a front tip of the light guide 6b, and is secured by the holder 6c.

The light guide 6b, the holder 6c, and the condensing lens 6d are determined with consideration of the focal distance of the observation optical system 1 and the condition of the observation target surface 4a of the observation target 4 in a state where the light guide 6b, the holder 6c, and the condensing lens 6d are combined to each other. For example, when the subject observation target surface 4a is defined as having a large area, the light guide 6b, the holder 6c, and the condensing lens 6d are determined by the combination capable of providing flood light for sufficiently illuminating the observation target surface 4a.

The illumination optical system retaining portion 7 is structured from a hole formed at the body tube 3. The illumination unit 6 having a condensing lens 6d attached at a front tip portion of the illumination unit 6 is inserted into the illumination optical system retaining portion 7, and the illumination optical retaining system 7 is positioned to enable the condensing lens 6d to condense the light irradiated from the light guide 6b for illuminating the observation target surface 4a and is fixed by the fixing member 6a.

Therefore, the optical axis 2 of the illumination optical system 2 is defined by the arrangement and position of the illumination optical system retaining portion 7 with respect to the observation optical system 1. Further, the arrangement of the condensing lens 6d of the illumination optical system retaining portion 7 has no particular restrictions as long as the condensing lens 6d is arranged in a position closer to the observation target 4 than the light guide 6b and is arranged to irradiate light over the observation target surface 4a.

As shown in FIG. 1, the illumination optical system retaining portion 7 is arranged as close as possible with respect to the two observation optical systems 1, is arranged relatively at the center of the two observation optical systems 1 when viewed from a lateral direction of FIG. 1, and is formed in a manner piercing the body tube 3 in a vertical direction. More particularly, since the illumination unit 6 is formed relatively in a straight-linear manner, the illumination optical system retaining portion 7 is formed as a straight linear hole piercing the body tube 3 so that the illumination unit 6 could easily and smoothly be inserted.

Nevertheless, the illumination optical system retaining portion 7 is not necessarily required to be a straight line and can be bent to a degree where the light guide 6b could be smoothly inserted when the illumination unit 6 is structured without the holder 6c.

As explained above, since the illumination optical system 2 has a structure in which the illumination optical system retaining portion 7 is formed in a straight linear manner and the illumination unit 6 with the condensing lens 6d attached at its front tip is disposed at the illumination optical system retaining portion 7, neither a prism nor numerous lenses are required for the illumination optical system 2. Accordingly, the attenuation of light irradiated from the illumination unit 6 caused by a prism and numerous lenses will be little, and illumination could be efficiently performed.

As shown in FIG. 2, the illumination optical system retaining portion 7 regarding this embodiment is formed for positioning a center (the optical axis 2a of the illumination optical system 2) inside a circle 9 having the distance between the centers of the two secondary objective lenses 1b (distance between the optical axes 1a) as its diameter and thus having each optical axis 1a included with respect to the plane 8 including the secondary objective lenses 1b, in which the secondary objective lenses 1b are defined as prescribed lenses of the objective lenses of the observation optical systems 1 positioned closest to the observation target.

The illumination optical system 7 has no particular restrictions regarding its angle, is defined so that the optical axis 2a will be positioned inside the circle 9 having the distance between each center of the two secondary objective lenses 1b as its diameter with respect to the plane 8 including the secondary objective lenses 1b of the two observation optical systems 1, and is defined so that the optical axis 2a will coincide with the optical axis 1a at the observation target surface 4a when the optical axis 1a of the observation optical system 1 coincide with the observation target surface 4a of the observation target 4 to form a focal point.

Accordingly, regarding the illumination optical system 2 inserted into the illumination optical system 7, the optical axis 2a is arranged relatively at the center of the optical axes 1a of the two observation optical systems, and the extending line of the optical axis 2a would reach the observation target surface 4a of the observation target 4 and coincide with the optical axes 1a at the observation target surface 4a. Consequently, the optical axis 1a and the optical axis 2a shown in FIG. 1 form a small angle so that the influence of shadows from a top surface 4b could be reduced as much as possible even when the observation target surface 4a is recessed with respect to a top surface 4b of the observation target 4.

Although the microscope A is structured as an inclined illuminator type microscope having the illumination unit 6 of the illumination optical system 2 inserted into the illumination optical system retaining portion 7 formed at the body tube 3, the optical axis 2a of the illumination optical system 2 could be positioned extremely in close proximity to the optical axis 1a of the observation optical system 1, an illumination similar to that of a coaxial illuminator type microscope could be obtained by positioning the optical axis 2a inside the circle 9 having the distance between the two optical axes 1a as its diameter with respect to the plane 8 including the prescribed objective lenses of the objective lenses of the observation optical systems 1 positioned closer to the observation target 4 (the secondary objective lenses 1b), and the influence of the top surface 4b upon the observation target surface 4a of the observation target 4 could be reduced even when the observation target surface 4a is in a recessed state with respect to the top surface 4b.

The microscope B regarding the second embodiment will be explained with reference to FIG. 3. It should be noted that the portions and the functions similar to those explained in the first embodiment will be assigned with the same reference numerals, while omitting the explanations thereof.

As shown in the figure, the microscope B regarding this embodiment has a same structure as the microscope A of the first embodiment except for the fact that a drum type magnification-changing portion 10 serves as the magnification-changing portion for the optical observation system 1. The drum type magnification-changing portion 10 has a lens group 10a through 10c coaxially arranged for providing a predetermined magnification, and is structured to enable external control for selecting any lens from the lens group 10a through 10c.

Accordingly, while observing the observation target surface 4a of the observation target 4, a dentist could rotate the drum type magnification-changing portion 10 and match a suitable lens group 10a though 10c with the optical axis of the observation optical system 1 for changing the magnification of the observation optical system 1.

Also with the microscope B, the optical axis 2a of the illumination optical system 2 is positioned in close proximity to the optical axis 1a of the observation optical system 1, and is positioned inside the circle 9 having the distance between the centers of the secondary objective lenses 1b (optical axis 1a) as its diameter and thus having each optical axis arranged along its circumference with respect to the plane 8 including the secondary objective lenses 1b of the two observation optical systems serving as the prescribed lenses arranged closer to the observation target 4.

Accordingly, although the microscope B is structured as an inclined illuminator type microscope having the illumination unit 6 of the illumination optical system 2 inserted into the illumination optical system retaining portion 7 formed at the body tube 3 in the same manner as the microscope A, the optical axis 2a of the illumination optical system 2 could be positioned extremely in close proximity to the optical axis 1a of the observation optical system 1, illumination similar to that of a coaxial illuminator type microscope could be obtained by positioning the optical axis 2a inside the circle 9 having the distance between the two optical axes 1a as its diameter with respect to the plane 8 including the primary objective lens 1b of the observation optical system 1, and the influence of the top surface 4b upon the observation target surface 4a of the observation target 4 could be reduced even when the observation target surface 4a is in a recessed state with respect to the top surface 4b.

As explained above in detail, the optical axis of the illumination unit and the optical axis of the observation optical system would be in close proximity to each other and form a small angle, a portion of the observation target subject for observation could be illuminated effectively, and although the microscope regarding this invention is an inclined illuminator type microscope, an illumination effect equaling to a coaxial illuminator type microscope could be obtained by disposing the illumination unit in close proximity to the two observation optical system, arranging the plane as including the prescribed lenses of the objective lenses of the observation optical systems positioned closest to the observation target (such as the primary objective lens), disposing the optical lens of the illumination unit inside the circle on the plane where the line connecting the optical axes of the two observation optical systems serves as the diameter of the circle, and coinciding the optical axis of the observation optical system and the optical axis of the illumination unit at the surface of the observation target.

More particularly, structuring a complex optical system comprised of a prism and numerous lenses will be unnecessary, attenuation of light could be reduced, and a large reduction in cost could be achieved in comparison with the conventional microscope by structuring the illumination optical system with an illumination unit comprised of a light guide, a holder, a condensing lens and the like.

The cross sectional area of an observation optical system will not be required to be large by using a zooming type as the magnification-changing form for the observation optical system. Therefore, the illumination unit could be arranged extremely in close proximity to the observation optical system and improve illumination effect.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. An inclined illuminator binocular stereomicroscope for dental treatment consisting of:
   right and left observation optical systems, each having a plurality of lenses for observing an observation target; and
   a single illumination optical system having an illumination unit for illuminating an object targeted for observation relatively perpendicular to a plane of the observation target without use of lenses or prisms to magnify or redirect the illumination;
   wherein the illumination unit has an optical axis arranged inside a circle, the circle having a diameter connecting the optical axes of the right and left observation optical systems in a plane including at least the lenses of the right and left observation optical systems positioned closest to the observation target.

2. The inclined illuminator binocular stereomicroscope according to claim 1, wherein a magnification-changing form of the observation optical system is a zooming type for moving a portion of the lenses in a direction of the optical axis.

3. The inclined illuminator binocular stereomicroscope according to claim 1, wherein the illumination unit has a light guide made of bundled optical fibers thereby to emit light from an external light source.

* * * * *